Nov. 24, 1964     D. E. SMITH ETAL     3,158,187
VEGETABLE PEELING AND CLEANING APPARATUS
Filed Aug. 2, 1962                     4 Sheets-Sheet 1
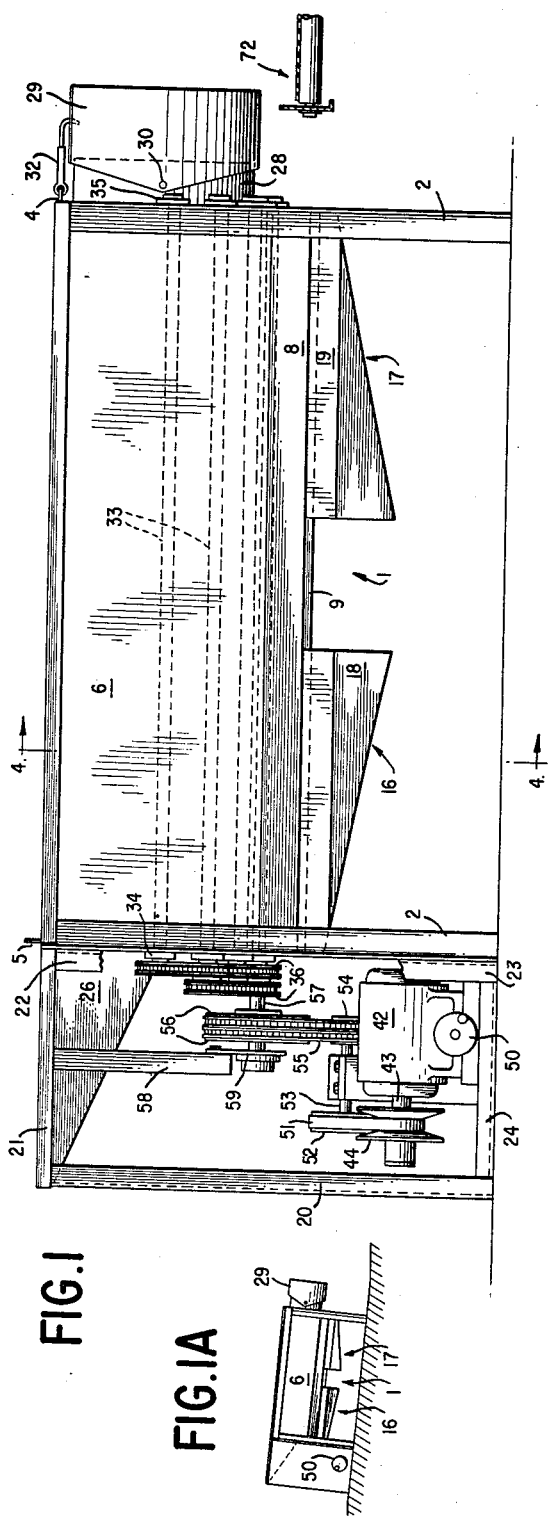
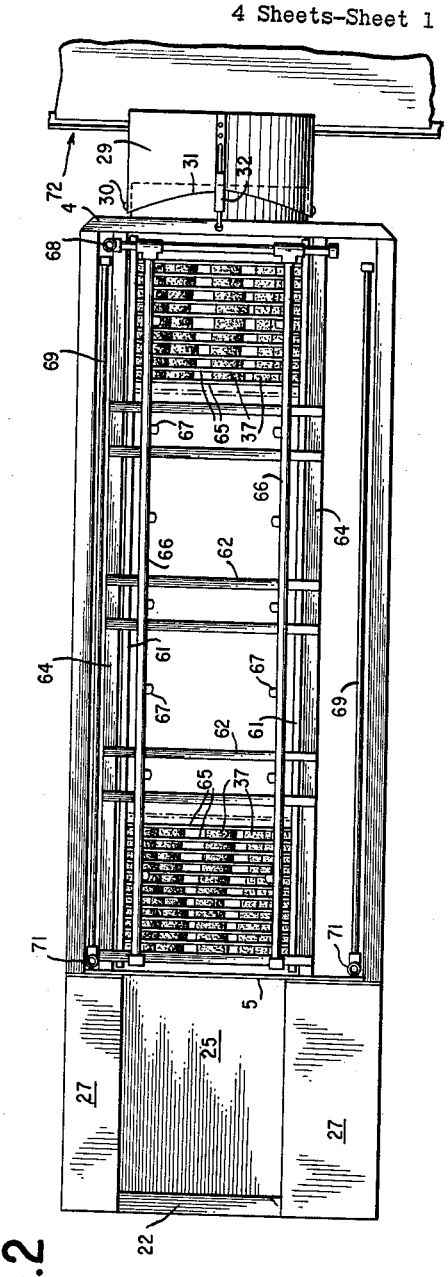
INVENTORS
DUANE E. SMITH
BY  MELVIN E. SEYMOUR
*Rudolph L. Lowell*
ATTORNEY

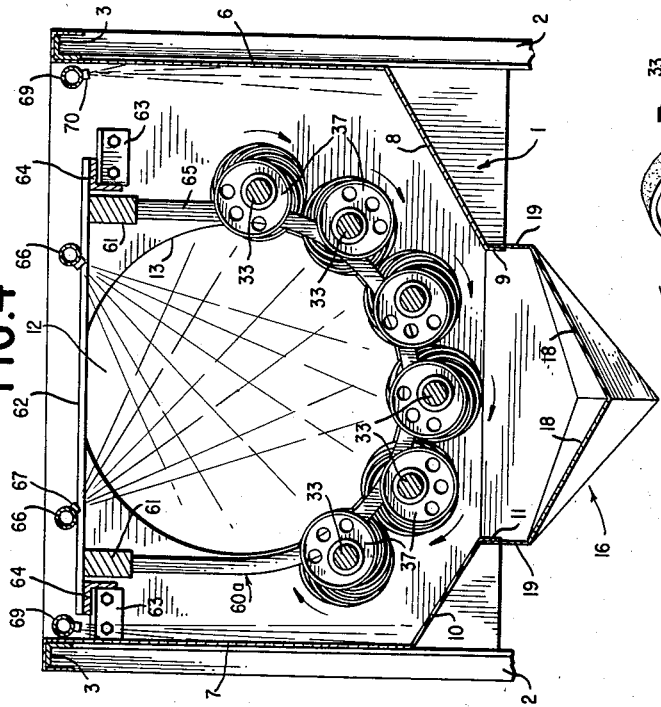

Nov. 24, 1964  D. E. SMITH ETAL  3,158,187
VEGETABLE PEELING AND CLEANING APPARATUS
Filed Aug. 2, 1962  4 Sheets-Sheet 3
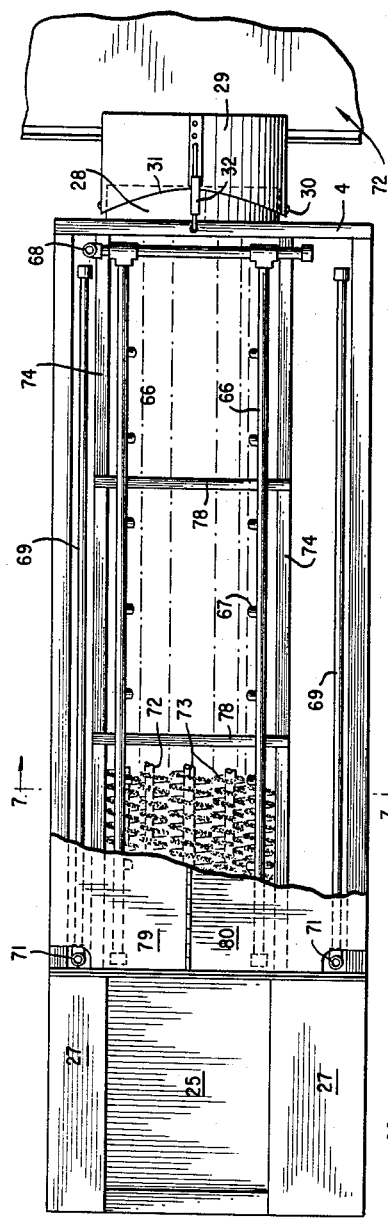
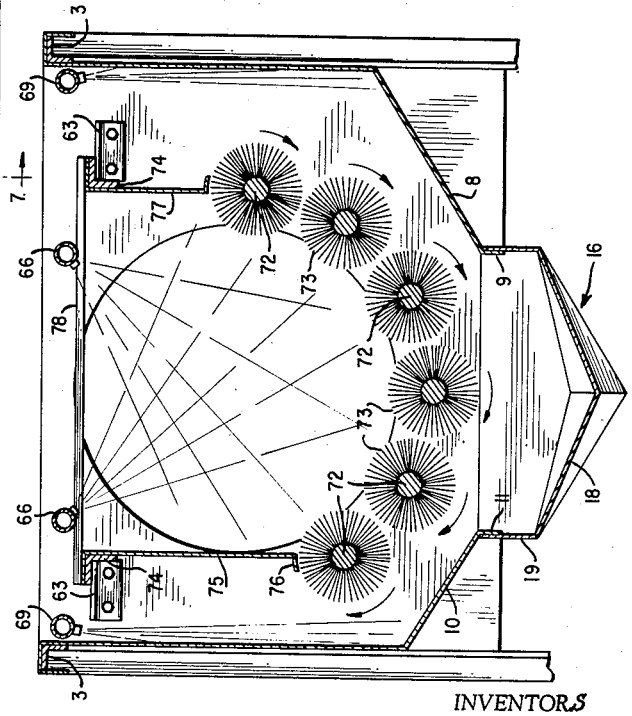
INVENTORS
DUANE E. SMITH
MELVIN E. SEYMOUR
BY
Rudolph L. Lowell
ATTORNEY

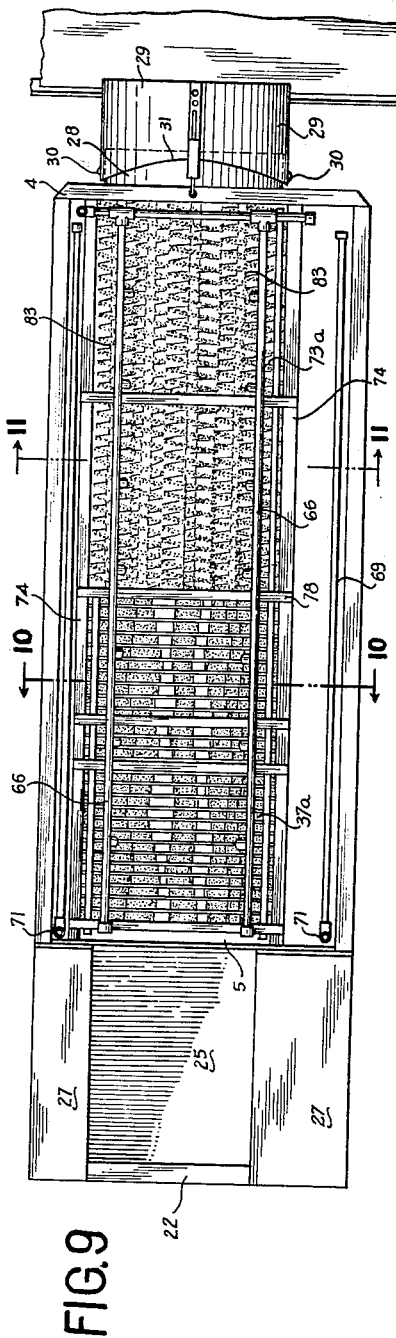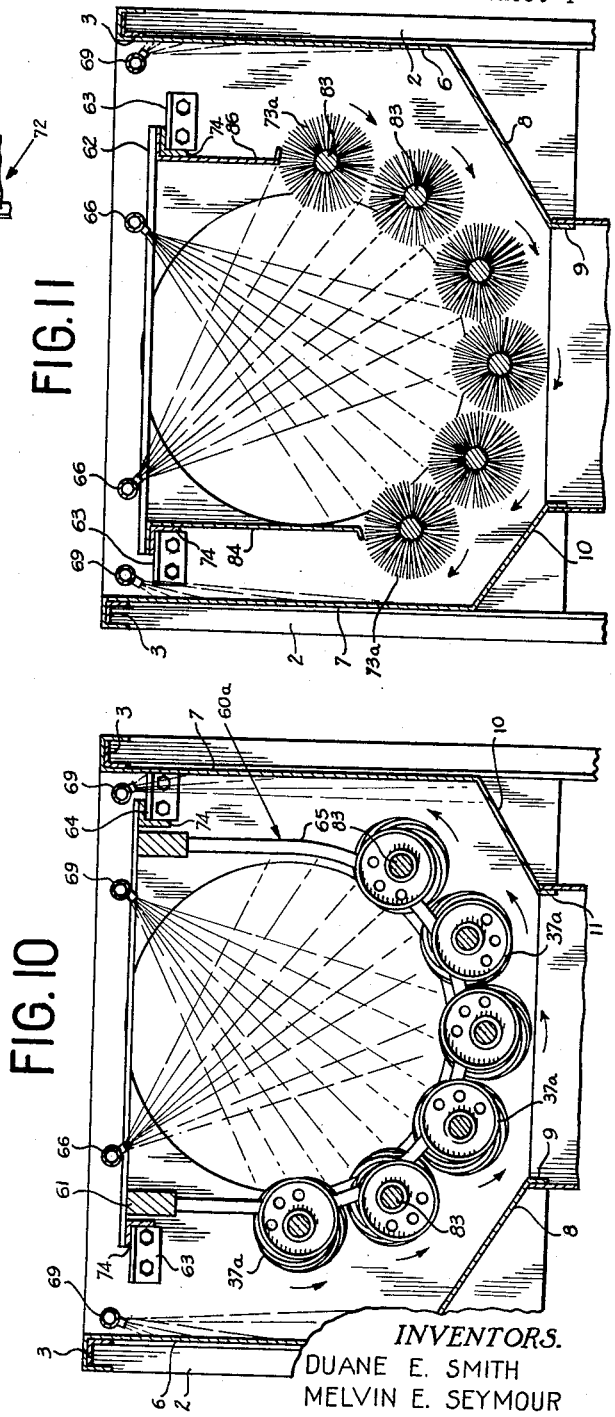

United States Patent Office 3,158,187
Patented Nov. 24, 1964

3,158,187
VEGETABLE PEELING AND CLEANING APPARATUS
Duane E. Smith and Melvin E. Seymour, Creston, Iowa, assignors to Veg-A-Peel Company, Incorporated, Creston, Iowa, a corporation of Iowa
Filed Aug. 2, 1962, Ser. No. 214,369
12 Claims. (Cl. 146—50)

The present invention relates in general to vegetable and fruit cleaning devices and more particularly such devices for cleaning potatoes and other root vegetables. Vegetable peelers and fruit cleaners of the character of the present device are used primarily for commercial purposes where a continuous cleaning process is desired. The present invention is directed to solving the problems of maintenance, operational costs and quality of product experienced in the prior art.

The primary object of the present invention is, therefore, to present a machine which will more efficiently remove the skins from certain fruits and vegetables without damage thereto with a minimum maintenance cost to the user.

A further object of the present invention is to provide a vegetable peeling device capable of handling a continuous load in conjunction with modern automation devices for feeding and receiving from the peeler.

A further object of the present invention is to provide a vegetable peeler wherein the length of time the vegetables are subjected to the tumbling motions as well as the speed of the individual vegetables through the peeler can be efficiently and simply controlled by a variable speed drive and an adjustable outlet means for the peeler.

A still further object of the present invention is to provide a vegetable peeler structure with interchangeable peeling members to selectively utilize either a positive abrasive surface for contacting the vegetables or a more gentle brushing and tumbling motion.

Another object of the present invention is to provide a novel vegetable peeler construction wherein the articles being peeled may be constantly suspended and subjected to a constant liquid spray for further cleaning.

A still further object of the present invention is to provide a rotatable cleaner member which is constructed of a plurality of selectively positioned eccentric members on a central shaft to provide an auger action for feeding the vegetables through the peeler.

A still further object of the present invention is to provide a cleaning member which may be selectively utilized in conjunction with the peeler device and which is composed of a helically formed continuous brush member.

The means by which the foregoing objects and other advantages, which will be apparent to those skilled in the art, are accomplished, are set forth in the following specification and claims, and illustrated in the accompanying drawings dealing with a preferred and alternate embodiments thereof. Reference is now made to the accompanying drawings in which:

FIGURE 1 is a side elevation of the entire peeling apparatus;

FIGURE 1a shows one method of installing the peeling device for the purpose of utilizing the force of gravity to aid the feed of the vegetables through the peeler;

FIGURE 2 is a top plan view of the over-all device;

FIGURE 3 is an end elevation showing the driving arrangement for the peeling members;

FIGURE 4 is a cross sectional view taken along lines 4—4 of FIGURE 1;

FIGURE 5 is an exploded detail of one of the peeling members showing the arrangement of eccentrics on a central shaft;

FIGURE 6 is a top plan view of the cleaning device illustrating an alternate embodiment thereof including helical brush peeling members;

FIGURE 7 is a cross sectional view taken along line 7—7 of FIGURE 6;

FIGURE 8 is a detail of the helical brush peeling member;

FIGURE 9 is a top plan view of the cleaning device showing another embodiment thereof including brush members and eccentrics on a central shaft;

FIGURES 10 and 11 are enlarged sectional views as seen along the lines 10—10 and 11—11, respectively, in FIGURE 9.

Referring now to the drawings, wherein like reference numerals are used to indicate identical parts in the various views, the preferred embodiment of the present invention, shown in FIGURES 1-5, comprises a sheet metal body, indicated generally by the numeral 1, for housing the rotatable vegetable peeling apparatus. The body 1 is supported by means of upright legs 2 which may be formed from angle irons or the like and which are connected by longitudinally extending side braces 3. The braces 3 are also constructed of angle irons which may be connected to the legs 2 by means of welding or any other well known expedient. The side braces 3 serve to connect the top ends of the legs 2 on both sides of the structure and also serve as a further support means for the body. Front and rear cross braces 4 and 5 respectively are welded or otherwise connected between the side braces 3 at the top ends of the legs 2 and may also be made of angle irons. As illustrated clearly in FIGURE 1, the cross brace 4 is located at the front or outlet end of the body 1 and has a flange extending in a horizontal plane away from the body of the device and the cross brace 5 is located at the rear or inlet end of the body and has one flange thereof extending in a vertical direction away from the body.

The details of the configuration of the sheet metal body 1 are most clearly illustrated in the cross sectional view of FIGURE 4 and include identical right and left side panels 6 and 7, the top edges of which are formed into an inverted U-shaped configuration to engage the side braces 3 to thus support the body. The lower end of the side panel 6 is angled inwardly and downwardly to form a sloping bottom section 8 for the body. The bottom section 8 has a downwardly extending flange 9 connected thereto for a purpose presently to be described. The bottom end of the left panel 7 is similarly angled inwardly to form bottom section 10 and includes a downwardly extending flange 11 with the section 10 and the flange 11 being formed in the identical manner as the section 8 and the flange 9. It will be further noted that the sloping bottom section 8 is of a greater length than the sloping section 10. The side panels 6 and 7 as well as the sloping bottom sections and the attached flanges extend the entire distance between the front and rear leg members 2 and may be securely attached thereto by welding or the like.

It will also be noted that the side panels, the sloping bottom sections and the flanges described may be either formed from an integral piece of sheet metal or may be separate panels welded at their adjacent edges. A rectangular end panel 12 is provided for the front or outlet end of the body and extends between the two front legs 2. The front panel 12 further includes a circular outlet opening 13, shown in FIGURE 4. A rear panel 14 extends between the two rear legs 2 and includes a rectangular access opening 15, as shown in FIGURE 3.

As thus far described, the body structure constitutes an open hopper type enclosure having slanted bottom walls with a longitudinal extending bottom open along the entire length thereof. As shown most clearly in FIGURE 1, the bottom side of the body is provided with two drainage pans 16 and 17 which angle toward each other and empty below the center portion of the body. Each of the drainage pans 16 and 17 comprises triangularly-shaped bottom walls 18 and upwardly extending side flanges 19 which are connected to the flanges 9 and 11 of the bottom sections 8 and 10 of the body. As shown in FIGURE 1, the high ends of the drainage members 16 and 17 are connected to the end panels of the body and a space is provided between the opposite ends of the drainage members. The drainage members 16 and 17 are opened at the ends thereof adjacent the middle portion of the body to permit the discharge of liquid collected from the side walls and bottom of the body proper.

A pair of additional upright legs 20 are spaced rearwardly from the inlet end of the peeler body and are connected to the longitudinal braces 3 by angle irons 21 which may be separate members or may, in the alternative, be merely extensions of the longitudinal braces 3. An end cross brace 22 extends between the upright legs 20 and is welded thereto. Additional upright angle irons 23 may be provided to further strengthen the frame structure and will be connected to the members 21 and extend adjacent to the rear upright legs 2 of the peeler body. To complete the over-all frame structure, a platform 24 is connected at its four corners to the bottom ends of legs 20 and legs 2 to provide mounting means for a purpose to be explained.

An inlet chute is located at the opening 15 in the rear panel of the peeler body and comprises a downwardly inclined bottom 25 which extends from the end cross brace 22 to the bottom edge of the rectangular opening 15. Side walls 26, one of which is shown in FIGURE 1, extend upwardly from the bottom 25 and further include horizontally extending flat panels 27 which rest on top of, and may be connected to, the angle irons 21 and 22. The entire inlet chute including the bottom, the sides and the panels 27 may be made from a single piece of sheet iron or may be fabricated from welded sections so as to form a water-tight enclosure which is sealed to the end panel 14 of the peeler body.

A cylindrical outlet extension 28 is secured to the peripheral edge of the opening 13 of the front panel 12 to provide a stationary outlet conduit for the peeler body. Mounted on the forward end of the extension 28 is an adjustable cylindrical sleeve 29 which is pivotally supported on the extension 28 by means of pivot bolts 30 located on either side thereof. As clearly illustrated in FIGURES 1 and 2, the pivoted end of the cylindrical sleeve 29 has its edge concavely curved, as indicated at 31, to extend away from the point of pivotal attachment to the extension 28. A similar curved edge is provided on the bottom half of the sleeve 29. A trunbuckle 32 is attached at one end to the front cross bar 4 of the body frame, and its forward end is hooked to the top of the sleeve 29. With this structure it will be seen that the position of the sleeve 29 may be adjusted by means of the turnbuckle to be upwardly or downwardly inclined from an aligned position with the outlet extension 28.

Six longitudinally extending shafts 33 are disposed within the body of the peeler and extend in horizontal parallel spaced relationship to provide a mounting means for the peeler members to be described. Each one of the shafts 33 extends the entire length of the peeler body 1 and is rotatably journaled in the rear panel 14 by means of bearings 34 carried by the panel 14. Front bearings 35 are carried by the forward panel 12 of the body and rotatably support the front ends of the six shafts 33. As shown in FIGURE 3, the rear ends of the six shafts 33, each carries a chain drive sprocket 36 which is keyed thereto for the purpose of transmitting rotational drive to the individual shafts. It will, of course, be understood that the bearings 34 and 35 are all identical and may be of any known type of bearing.

Looking now to FIGURES 4 and 5, the details of the peeling members of the preferred embodiment of the present invention will be described in detail along with their relative mountings on the individual shafts 33. Each individual shaft 33 is provided with a plurality of spaced peeler members 37, each of which comprises a flat, circular disc having an annular flat rim 38 which provides a peeling surface 39. All of the peeler members are identical in structure and further include a circular opening 40 which is approximately the same diameter as the shafts 33. Each eccentric disc 37 further includes a series of three circular openings 41 formed in its flat surface thereof with each of the holes 41 being located the same radial distance from the center of the opening 40. The holes 41 may be spaced at an angle of 22½° to 45° from each other, with a 22½° spacing being illustrated in FIGURES 4 and 5, and the end holes of the series of three may be spaced at an angle of 45° to 90° between their centers, with a spacing of 45° being shown in FIGURES 4 and 5. The purpose for the holes 41 is to aid in the positioning of the eccentrics on the shaft 33 as well as presently explained.

To complete the details of the eccentric peeling members, an abrasive surface may be provided for the cylindrical surface 39 and may be in the form of an adhesive tape which is glued to the surface of the rim 38 to provide a temporary and replaceable abrasive surface. The abrasive tapes utilized in the present invention are commercially available and the details of these tapes form no part of the present invention. These abrasive tapes are temporary in nature and may be readily removed or replaced by an abrasive of suitable coarseness for the type of vegetables being peeled. In the alternative, the bare surface of the eccentric members 37 may be utilized without the abrasive tapes under certain conditions.

In assembling the eccentrics 37 on the shaft 33, the eccentrics are initially heated until the shaft 33 passes freely through the openings 40 and when the eccentric is in the desired position on the shaft, the eccentrics are cooled and thus shrunk into positive mounted position on the shaft. As shown most clearly in FIGURE 5, the eccentrics are mounted on shaft 33 in such manner as to generate a generally helical surface or helicoid made up of the individual surfaces of the spaced eccentric members.

For the purpose of illustration, consider the details of the arrangement in FIGURE 5 wherein the first eccentric which is shown mounted on the left end of the shaft is first positively located on the shaft 33. Following this, each successive eccentric which is mounted on the shaft 33 will be spaced from the previously positioned eccentric and will be rotated to be offset, in the present instance, at an angle of 45° from the preceding eccentric. In accomplishing this, the holes 41 are aligned so that the end hole of one eccentric is aligned with the opposite end hole of the series of holes in the preceding eccentric. In this fashion the eccentrics may be accurately positioned on the shaft 33 to form a twisted or helical surface, and it will be understood that the eccentrics may be offset at any desirable angle as long as it is uniform along the shaft.

In viewing the mounted set of eccentrics in FIGURE 5 from the right end of the shaft 33 as illustrated, it will be noted that each successive eccentric has been offset an angle of 45° in a counterclockwise direction. This relationship is shown also in FIGURE 4, which is a view looking from the inlet end of the device toward the outlet end. In FIGURE 5 it will be noted that, starting from the extreme right-hand shaft 33, the eccentrics are offset in a counterclockwise direction on the shaft 33 and that the next three successive shafts, moving to the left of FIGURE 4, are identical in the manner of offset of the eccentrics on the shafts. The two end shafts 33 on the left-hand side of FIGURE 4 are noted to be arranged so that the eccentrics thereof are offset on the shafts in a clockwise direction which is opposite from the other four shafts of the set of six. In actual operation, the shafts 33 are all rotated in the same or clockwise direction, as indicated by arrows in FIGURE 4.

With this arrangement it will be understood that the left-hand or counterclockwise twisted helical surface provided by the four adjacent shafts on the right-hand side of FIGURE 4, when rotated in the direction indicated, will serve to auger the material resting thereon in a forward direction toward the outlet opening 13 of the peeler body. At the same time, the left-hand two shafts 33, being rotated in the same direction, but being oppositely offset to provide an opposite twist to the helical surface of the eccentrics, will serve to direct the material resting thereon back toward the inlet of the peeler body or toward the viewer when looking at FIGURE 4.

The vegetables being treated by the present device will therefore receive a bouncing or tumbling action by contact with the eccentric portions of the discs 37 as the discs are rotated and the material will also be fed toward the outlet opening of the device by the four shaft and eccentric arrangements on the right-hand side of the machine. At the same time, the end two shaft and eccentric arrangements on the left-hand of the machine will oppose the feeding out of the material in such a manner as to augment the natural tumbling provided by the eccentrics to thereby increase the total tumbling and circulation of the vegetables being treated within the peeler body. The general direction of movement, however, will be toward the outlet opening 13.

The details of the drive arrangement for the shafts 33 are shown in FIGURES 1 and 3, and comprise an electric motor 42 having a drive shaft and a drive pulley 43 and 44, respectively, connected thereto. As seen in FIGURE 3, the motor 42 has a movable base 45 which slidably engages guide rods 46 which are stationary with the frame structure of the peeler. The base 45 has a threaded block 47 fixed thereto for the reception of the feed screw 48 which is journaled to a bearing block 49 secured to the frame of the peeler. A crank 50 is affixed to the end of the screw 48 in a well known manner so that the motor and the base 45 may be selectively positioned along the guide rods 46 by manipulation of the crank 50 and feed screw 48. A drive belt 51 is trained about the pulley 44 and engages a driven pulley 52 mounted in a stationary bearing member for the purpose of transferring the drive from the motor 42 to the pulley 52.

With the structure described, the speed of the driven pulley 52 may be regulated by the positioning of the motor 42 through the feed screw 48 to either tighten or loosen the driving engagement of the belt 51. The pulley 52 is fixed on rotatable shaft 53 which has sprockets 54 fixed to its opposite end for engagement with drive chains 55, which positively transfer the rotation of sprockets 54 to sprockets 56 which are keyed to the extended end 57 of the central shaft 33 which is the lowest positioned shaft of the six shafts utilized.

To provide further support for the end 57 of the driven shaft 33, two angle iron braces 58 are welded or otherwise secured to the angle irons 21 of the peeler frame and extend downwardly and inwardly to a point where they are attached to a bearing plate 59 to provide an end support bearing for the shaft 33. The rotation of the sprockets 56 on the center shaft 33 is transferred to the remaining five shafts by means of identical chains 60 connected between the sprockets 36 of the shafts as illustrated in FIGURES 1 and 3. With the arrangement illustrated, it will be noted that the clockwise rotation imparted to the sprockets 56 is transferred to each of the shafts 33 by the chains 60 and the sprockets 36 in such a manner as to drive all of the shafts 33 in the same or clockwise direction.

A removable basket unit, indicated generally at 60a, is supported within the peeler body in the preferred embodiment and comprises longitudinally extending bars 61 which are transversely spaced and extend longitudinally within the body 1. Two of these support bars 61 are illustrated in FIGURES 2 and 4 and are connected by a plurality of cross members 62 which may be welded or otherwise connected to the bars 61 and serve to hold the support bars 61 in spaced relationship. Four angle iron brackets 63 are bolted or otherwise affixed to the front and rear panels 12 and 14, respectively, of the body and serve as a support means for the two longitudinally extending angle irons 64 which are securely attached to the brackets 63, as shown in FIGURE 4.

The angle irons 64 are transversely spaced within the body and are located on the outside of the two support bars 61 and serve as a supporting surface for the opposite ends of the cross members 62 as illustrated. The body of the basket 60a comprises a plurality of closely spaced U-shaped rods or bars 65, the upwardly extending legs of which are securely attached to the spaced bars 61 to form the basket.

When the basket unit 60a is positioned in place within the body of the peeler, with the cross members 62 resting firmly upon the angle irons 64, the U-shaped rods or bars 65 extend downwardly and pass between the individual eccentrics 37 mounted on the spaced shafts 33. As also illustrated in FIGURE 4, the low spot on the eccentrics will be flush with the surface of the adjacent rod 65 as it passes the rod, and the high point of each of the eccentrics will extend a substantial distance beyond the surface of the rods 65 as the eccentrics rotate. This relationship insures the feed of the material as it passes through the body of the peeler and at the same time prevents the individual vegetables from falling between the shafts which would result in injury or breaking up of the vegetables. The basket arrangement and the rotating eccentrics thus provide for a very positive tumbling of the vegetables without the danger of mashing or breaking up of the vegetables.

Means for constantly directing a stream of water, steam, or other liquid onto the tumbling mass of vegetables to aid in the peeling process and to maintain the peeled vegetables clear of waste matter is provided in the form of longitudinally extending and transversely spaced water pipes 66 which have spaced nozzles 67 for directing a liquid spray downwardly onto the basket unit and the rotating eccentrics. These pipes may be fed from any suitable source by means of a connection 68 which services both of the spaced pipes 66.

A second set of pipes 69 are carried within the body 1 and are located at the upper side edges of the body and attached thereto. Spaced nozzles 70 are fitted to the pipes 69 and direct the stream of liquid downwardly over the side walls 6 and 7 of the body for the purpose of maintaining the body member clear of waste material and to maintain a constantly flowing stream over the sides 6 and 7 and along the slanted bottom panels 8 and 10 of the body. The pipes 69 may be fed from any suitable source through fittings 71. The liquid being applied by the nozzles 67 and 70 will, of course, flow down along the sides of the body 1 and drain into the pans 16 and 17 and will be directed to the central portion of the underside of the peeler structure where the liquid will be discharged from the body.

As indicated in FIGURE 1a, the entire peeler structure may be installed on an inclined floor surface to utilize the effect of a gravity feed through the body of the peeler to aid the feeding action auger surfaces of the shaft and eccentric assemblies. This expedient is suggested as an additional means for controlling the feed of the material through the peeler and for controlling the time during which any particular article is treated by the peeler. Other expedients such as adjustable legs or blocking means could also be utilized to provide a slant or tilt the peeler body.

At the outlet position, a continuously operating endless belt conveyor 72 may be provided to receive the continuous discharge from the cleaning device, whereby the peeled or cleaned vegetables and fruit will be constantly delivered from the device.

In considering the over-all operation of the present device, the process of cleaning a batch vegetables or fruit is begun by setting the shafts 33 and the eccentric members into rotational motion by means of the electric motor and drive transmission. The liquid spray means 66, 69 are turned on and at this point the device is ready for the reception of vegetables to be cleaned. The vegetables may be hand fed or automatically fed into the inlet chute and will slide down the inclined bottom 25 thereof into the basket structure 60a of the body. With the rotation of the eccentric members, the individual vegetables will be constantly tumbled and rubbed against one another and against the abrasive surfaces 39 of the rims of the eccentrics 37 while at the same time being washed constantly by a spray from the pipes 66.

The feed of the right-hand set of the four shaft and eccentric assemblies serves to move the vegetables in a general direction toward the outlet of the body and the counter feed of the two remaining shafts 33 serves to augment the tumbling and circulation of the vegetables as they pass in a generally outwardly directed motion through the peeler. The vegetables, when completely cleaned and peeled will pass through the outlet orifice 13 into the outlet sleeve 29 and from thence on to the moving conveyor 72 and will be subjected to further handling and packing.

As before mentioned, the speed of the rotating shafts 33 and thus the feed of the material to the body may be regulated by adjusting the position of the motor and drive pulley 44 by means of the crank 50. In addition to this control of the speed and time factor, the entire body may also be mounted on an inclined surface as illustrated in FIGURE 1a, and further, the outlet sleeve 29 may be adjusted so as to allow the material to either freely pass out the body or may be angled slightly upwardly in order to form a slight resistance to the passing of the material and to thus cause the material to remain in the body for a longer period. The adjustment of the postion of the outlet sleeve 29 is, of course, accomplished by the manipulation of the turnbuckle 32 in a well known manner.

An alternate embodiment of the present invention is illustrated in FIGURES 6, 7 and 8 with certain alterations being made in the type of rotating cleaner elements and the configuration of the basket unit therefor. Since the details of the over-all body structure, drive means, and inlet and outlet arrangements of the modified version of the present invention in FIGURES 6–8 are identical to that described for the preferred embodiment, the identical reference numerals have been utilized except as to the portions of the arrangement which have been modified. Only as much as necessary of the modified form of the invention will be described which is necessary for its understanding.

As indicated in FIGURE 7, the longitudinally extending shafts 33 of the preferred embodiment have been replaced by shafts 72 which are identical in number and in placement as the original shafts 33. The identical peeler body structure, including the bearing means 34 and 35 in the end plates of the body may be utilized to mount the shafts 72. The drive details for the shafts 72 are identical to that described for the preferred embodiment including the direction of rotation of the shafts to facilitate a change-over from the preferred embodiment involving the eccentric peeling means to the shafts 72.

The details of the modified form of peeler members are illustrated in FIGURE 8 with the peeler member comprising a brush 73, the bristles of which are attached to the longitudinally extending shaft 72 in a well known manner. The composition of the brush may be that of nylon or polypropylene or any ordinary material utilized for forming brush bristles. The advantage in utilizing the material such as nylon or polypropylene is that such material absorbs less moisture than ordinary bristles and thus holds up better and longer under constant use subject to the liquid spray of the device.

As will also be seen in FIGURES 6 and 8, the brush forms a general cylindrical surface with the bristles being disposed upon the shaft 72 in the form of a helical flight similar to the helical flight of a screw auger. As viewed in FIGURE 8, it will be noted that, looking from the left end of the brush member illustrated, that the helical flight is disposed about the central shaft 72 in a counterclockwise direction. This disposition will give the necessary feeding motion to the material within the body of the peeler to move the material from the inlet end to the outlet when the brush members are rotated in the clockwise direction as indicated by the arrows in FIGURE 7.

This action is similar to the auger action provided by the eccentric and shaft assemblies of the right-hand portion of the preferred embodiment of the invention. It will be noted that in the modified version, all of the brushes are rotated in the same direction and all of the helical flights formed by the bristles of the brush members are directed in a counterclockwise direction so that all of the brushes can feed the material from the inlet to the outlet.

In the embodiment of the invention illustrated in FIGURES 6–8, the basket unit of the preferred embodiment has been eliminated and, instead, an enclosure structure has been substituted which comprises longitudinally extending angle irons 74 which correspond to the angle irons 64 of the preferred embodiment. A sheet metal wall panel 75 is affixed to the angle iron 74 on the left-hand side of the body, as viewed in FIGURE 7, and extends downwardly to a position directly adjacent to the end brush member on the left side of the series of brushes. The panel 75 terminates in a laterally extending flange 76. An identical sheet metal wall panel 77 is attached to right-hand angle iron 74 and differs from the panel 75 only in width. The panel 77 also terminates in a laterally extending flange adjacent the end brush member of the right side of the series of brushes. The function of the two wall members 75 and 77 is that of preventing the tumbling vegetables or fruit from spilling over the side of the rotating brushes during cleaning.

Cross members 78, two of which are shown in FIGURE 6, extend between the two angle irons 74 and serve to maintain the angle irons and the walls 75 and 77 in spaced relationship. As in the preferred embodiment, the angle irons 74 are supported by means of the end angle brackets 63 utilized in the preferred embodiment. The liquid spray means of the modified form of the invention are identical to that shown for the preferred embodiment.

A cover for the open top of the peeler body is also illustrated in FIGURE 6 and it will be understood that this cover structure may be also applied to the preferred embodiment of the present invention. The cover will function to prevent any material from splashing out of the peeler if the need becomes apparent. The cover unit may be of a well known type which includes two sections 79 and 80 which are hinged together at the center of the body structure as illustrated, with cut-out areas to allow the passage of water pipes for connecting the spray means. The cover unit may simply rest on the side angle irons and the front and rear cross members 4 and 5.

In operation, the modified form of the invention shown in FIGURES 6, 7 and 8 is similar to the preferred embodiment in that the produce being peeled or cleaned will be continuously fed through the device at a controlled rate and will be subjected to the constant liquid spray. The rotating brush members will, however, subject the material to a more gentle treatment. First of all, all of the helical flights of the brush members are directed in the same direction to give a continuous, even flow to the material as distinguished from the mixing or circulating action provided by the oppositely directed auger action in the preferred embodiment. There will be no bouncing action similar to that provided by the eccentric members of the preferred embodiment and the only tumbling action will be that provided by the rotating surfaces of the brush members as they contact the material. The rotating brushes will be of special utility in the peeling or skinning of fruit or of young or tender skinned vegetables such as new potatoes utilized by the potato chip industry.

When the brush members of the device are utilized in combination with a spray of steam or a cleaning solution, an excellent peeling job may be accomplished on tender skinned vegetables. It will, of course, be possible to vary the size and stiffness of the bristles of the rotating brushes to obtain the proper peeling action on a given vegetable. Nylon or polypropylene bristles have been found to give the best results in the way of a longer life for the brush members and less absorption of the washing liquids being constantly sprayed on the rotating brushes.

The modified form of the invention may also be utilized for merely washing vegetables and fruits prior to packaging processes. It will be necessary, of course, to choose a very fine bristle for the cleaning operation. With the use of this invention, a very thorough, but gentle washing and cleaning of fruits and vegetables for canning or freezing may be accomplished. The continuous and thorough action provided by the rotating brushes is of special utility in modern frozen food packaging processes.

A further embodiment of the invention is shown in FIGURES 9, 10 and 11 wherein cleaning members or eccentrics 37a are used with rotary brushes 73a to provide a variable cleaning and peeling action on the produce being worked upon. Since the over-all body structure, drive means, and inlet and outlet assemblies of this embodiment are similar to that shown for the embodiment of FIGURES 1–5, inclusive, like reference numbers will be applied to like parts in FIGURES 9–11.

As shown in FIGURE 9 the cleaning device includes shafts 83 which are identical in number and in placement as the original shafts 33. The identical body structure including the bearing means 34 and 35 in the end plates 12 and 14 may be used to mount the shafts 83. Also the drive details for the shafts 83 are identical to that for the shafts 33 including the direction of rotation of the shafts.

The peeler or cleaner members for the embodiment of FIGURES 9–11, as illustrated in FIGURES 9–11, include the shafts 83, each of which carries over about one-half of the length thereof cleaning or peeling members 37a which are the same in construction and relative arrangement as the members 37 previously described in connection with FIGURES 4 and 5. Each remaining half length portion of a shaft 83 carries a brush 73a similar in all respects, except as to length, to the brush 73 described in connection with FIGURE 8. As best appears in FIGURE 9 the eccentric members 37a are carried over that half portion of a shaft 83, which is adjacent to the inlet chute of the cleaning machine, so that the brush section of a shaft 83 is adjacent to the outlet extension 28.

The eccentric members 37a (FIGURES 9 and 10) on each shaft 83 are associated with a removable basket unit 60a in all ways similar to the construction and assembly of the basket unit 60a and eccentrics 37 described in connection with FIGURES 2 and 4. Likewise the brushes 73a on the shafts 83 are relatively arranged and assembled within the body 1 similarly to the arrangement and assembly of the brushes 73 on the shafts 72 previously described in connection with FIGURES 7 and 8.

As shown in FIGURE 11 the side walls 84 and 86, are the same in all respects to the side walls 75 and 77 illustrated in FIGURE 7, except for being of a shorter length so as to be coextensive only with the brush sections of the shafts 83. The cover unit shown in FIGURE 6, as comprised of the sections 79 and 80, may be utilized with the machine embodiment of FIGURES 9, 10 and 11 and may rest on the side members 3 and the front and rear cross members 4 and 5, respectively.

In operation the eccentric cleaning members 37a and the brushes 73a on the shafts 83 function in all ways similar to the members 37 on the shafts 33 (FIGURE 4) and to the brushes 73 on the shafts 72 (FIGURE 7). This similarity in operation will become apparent from a consideration of FIGURES 4 and 7, with FIGURES 10 and 11, respectively. However, by virtue of the assembly of the eccentrics 37a and brushes 73a on the common shafts 83, the fruits or vegetables to be cleaned are subjected to different cleaning actions or treatments as they progress along the shafts 83 from the inlet to the outlet of the machine, with the peeling action by the eccentrics 37a being more vigorous than the peeling action by the brushes 73a, and with the brushes acting to impart a more gentle and thorough cleaning action than is accomplished by the eccentrics alone.

It will be apparent, of course, that the combined use of the eccentrics and brushes in a single machine, can be varied from that illustrated in FIGURES 9, 10 and 11 so as to produce a desired cleaning action in accordance with the condition of the vegetables and fruits to be acted upon, i.e., in accordance with the tenderness of the produce and/or their previous treatment by steaming, caustic cleaning solutions and the like.

The present invention thus provides novel and useful improvements in fruit or vegetable peeling and washing apparatus of the character described. The arrangement and types of structural components utilized within the invention may be subjected to numerous modifications well within the purview of this invention, and applicant intends only to be limited to a liberal interpretation of the specification and appended claims.

Having thus described the invention, what is claimed as new and desired to be secured by Letters Patent is:

1. A produce peeling apparatus comprising:
    (a) a hollow body having end enclosures,
    (b) an inlet opening in one of said enclosures and an outlet opening in the other of said closures,
    (c) a plurality of parallel shafts journaled in said end closures and extending therebetween,
    (d) said shafts being spaced in a curved pattern adjacent the bottom edge of said outlet opening to form a curved support in the bottom of said body,
    (e) eccentrics mounted on said shafts in spaced relation, with the eccentrics being angularly offset from each other at the same angle and in the same direction on any given shaft,
    (f) drive means to rotate all of said shafts and eccentrics about their individual axes,
    (g) a removable basket structure rigidly mounted in said hollow body and having U-shaped support members disposed adjacent the curve of said spaced shafts and passing between the spaced eccentrics on said shafts,
    (h) whereby the eccentrics extend above said members during rotation to peel produce contained in said basket by contact therewith.

2. The combination according to claim 1 wherein,
    (a) said outlet opening is provided with an adjustable cylindrical sleeve,
    (b) said sleeve being pivoted about a transverse axis and further including means to adjust the vertical angle of said sleeve with respect to said outlet opening.

3. The combination according to claim 1 wherein,
    (a) the offset eccentrics are so disposed so as to form a helical feed for the produce contacted thereby,
    (b) and the eccentrics of certain of said shafts are angularly offset in one direction while the eccentrics of the remaining shafts are offset in the opposite direction to provide a counter feed.

4. The combination according to claim 1 wherein said eccentrics comprise flat circular disc members having annular rims to provide an abrasive contact surface.

5. A produce peeler comprising:
 (a) a hollow body having an inlet opening and an outlet opening,
 (b) a plurality of parallel shafts journaled in said body and extending between said inlet and said outlet openings,
 (c) said shafts being closely spaced to form a curved support in the bottom of said body,
 (d) eccentrics mounted on said shafts in spaced relation, with the eccentrics being angularly offset from each other at the same angle and in the same direction on any given shaft,
 (e) means to rotate said shafts,
 (f) a removable basket structure rigidly carried by said body and including a plurality of support members disposed between said eccentrics and passing upwardly from each side of said curved bottom,
 (g) whereby the eccentrics extend above said members during rotation to peel produce contained in said basket by contact therewith.

6. The combination according to claim 5 wherein,
 (a) said outlet opening is provided with an adjustable cylindrical sleeve,
 (b) said sleeve being pivoted about a transverse axis and further including means to adjust the vertical angle of said sleeve with respect to said outlet opening.

7. The combination according to claim 5 wherein,
 (a) the offset eccentrics are so disposed so as to form a helical feed for the produce contacted thereby,
 (b) and the eccentrics of certain of said shafts are angularly offset in one direction while the eccentrics of the remaining shafts are offset in the opposite direction to provide a counter feed.

8. The combination according to claim 5 wherein said eccentrics comprise flat circular disc members having annular rims to provide an abrasive contact surface.

9. In a produce peeling machine having a hollow body, a plurality of parallel rotatable peeling shafts including longitudinally spaced peeling members carried thereby, with said shafts and peeling members forming a curved support in the bottom of said body, a support basket unit comprising:
 (a) a pair of transversely spaced longitudinally extending support members located in said body above said curved support,
 (b) means to rigidly suspend said support members in said body,
 (c) a plurality of U-shaped bars having the legs thereof respectively fixed to each of the pair of support members,
 (d) each of said U-shaped bars extending adjacent the curved support and between the spaced peeling members carried by said shafts,
 (e) whereby said peeling members extend into said basket unit upon rotation to contact produce contained therein for peeling.

10. A produce peeler comprising:
 (a) a hollow body having end closures,
 (b) an inlet opening in one of said closures and an outlet opening in the other of said closures,
 (c) said outlet opening having a curved edge along its lower periphery,
 (d) a plurality of parallel shafts journaled in said end closures and extending therebetween,
 (e) said shafts being closely spaced along the curved edge of said outlet opening to form a curved support in the bottom of said body,
 (f) impact peeling means carried by each of said shafts, said peeling means including eccentrics mounted on said shafts in spaced relation, with the eccentrics being angularly offset from each other at substantially the same angle and in the same direction on any given shaft,
 (g) drive means to rotate all of said shafts and said peeling means about the axes of said shafts, and
 (h) a removable means rigidly mounted in said body, said removable means including a basket structure having U-shaped support members the lower portions of which are disposed adjacent said curved support and located between the spaced eccentrics on said shafts.

11. The combination according to claim 10, wherein:
 (a) said impact peeling means also includes brush means having bristles fixed to each of said shafts with said bristles being disposed in a continuous helical path on the surfaces of the shafts,
 (b) said bristles being disposed and rotated in a direction so as to provide a longitudinal feed of produce to said outlet.

12. The combination according to claim 1 including:
 (a) brush means mounted on selected sections of said shafts, and
 (b) said brush means having bristles disposed in a helical path and rotated in a direction to provide a longitudinal feed toward said outlet opening.

References Cited in the file of this patent
UNITED STATES PATENTS

| | | |
|---|---|---|
| 1,441,161 | McCabe | Jan. 2, 1923 |
| 1,452,738 | Hoberg | Apr. 24, 1923 |
| 1,995,693 | Urschel | Mar. 26, 1935 |
| 2,249,787 | Savage | July 22, 1941 |
| 2,472,460 | Banks | June 7, 1949 |
| 2,609,022 | Lowe | Sept. 2, 1952 |